United States Patent

Low et al.

[15] 3,700,897

[45] Oct. 24, 1972

[54] INFRARED DETECTORS

[72] Inventors: George M. Low, Acting Administrator of the National Aeronautics & Space Administraton with respect to an invention of; Chris Gross, 118 Glascock Court, Hampton, Va. 23366; Robert J. Mattauch, 615 Moseley Drive, Charlottesville, Va. 22903

[22] Filed: Feb. 5, 1971

[21] Appl. No.: 112,998

[52] U.S. Cl. ........250/83 R, 250/83.3 R, 250/83.3 H

[51] Int. Cl. ..........................................G01j 5/10

[58] Field of Search...........250/83 R, 83.3 R, 83.3 H

[56] References Cited

UNITED STATES PATENTS

| | | | |
|---|---|---|---|
| 3,117,229 | 1/1964 | Friedland | 250/83.3 R |
| 3,383,508 | 5/1968 | Russell | 250/83 R |
| 3,570,112 | 3/1971 | Barry et al. | 250/49.5 R X |
| 3,351,758 | 11/1967 | Armantrout et al. | 250/83.3 R |
| 3,198,012 | 8/1965 | Argue et al. | 250/83.3 H X |

OTHER PUBLICATIONS

Electron Beam Control of FET Characteristics, by A. J. Speth, from IBM Tech. Disclosure Bull., Vol. 8, No. 4, Sept. 1965

*Primary Examiner*—Archie R. Borchelt
*Attorney*—John R. Manning, Howard J. Osborn and William H. King

[57] ABSTRACT

High quality performance infrared photodetectors and a method for making them from a semiconductor material. The semiconductor material is irradiated with an electron beam to produce defect levels in a semiconductor material thereby improving the performance of the photodetectors.

4 Claims, 2 Drawing Figures

INVENTORS
CHRIS GROSS
ROBERT J. MATTAUCH
BY Howard J. Osborn
William H. King
ATTORNEYS

INFRARED DETECTORS

ORIGIN OF THE INVENTION

The invention described herein was made in the performance of work under a NASA contract and is subject to the provisions of section 305 of the National Aeronautics and Space Act of 1958, Public Law 85–568 (72 Stat. 435; 42 USC 2457).

BACKGROUND OF THE INVENTION

The invention relates generally to photodetectors and more specifically concerns infrared (IR) photodetectors. Prior art extrinsic infrared photodetectors are made from chemically doped semiconductor materials. Although good quality detectors can be made from chemically doped semiconductors, the extremely close control of the doping concentration and profile that is necessary limits the yield of these devices. It is therefore the purpose of the invention to provide IR photodetectors and a method for making them that eliminates some of the problems encountered in IR photodectors made by previous methods.

The extrinsic photoconductivity associated with the radiation-produced defect levels is in general analogous with that associated with chemical impurity levels. However, there are some important differences. For example, the radiation-produced levels that are in the upper half of the band gap are acceptor-like and those in the lower half are donor-like. This situation is the reverse of that of the normal photoconductor, i.e., the donor levels are in the upper half while the acceptor levels are in the lower half of the band gap. In order that there be extrinsic photoconductivity associated with the radiation-produced defect levels, the acceptor and donor levels must be at least partially filled with electrons or holes, respectively. It is therefore necessary to start with impurity doped silicon (or germanium) with shallow energy levels in order that the radiation-produced defect levels contain carriers.

These differences in the position of the defect levels lead to an advantage that the irradiated photodetector has over the conventional photodetector. Namely, it is possible to make the number of thermally generated background carriers very small. This is very important since the output signal from the detector is inversely proportional to this background concentration. To illustrate this point, let us examine the two following cases: (1) the irradiated n-type photodetector contains a shallow donor level $E_D$ of concentration $N_D$ and a radiation-produced defect level $E_A$ of concentration $N_A$; and (2) the analogous case for an n-type conventional photodetector with a donor level $E_D'$ ($E_D' = E_A$) of concentration $N_D'$ and a shallow acceptor level $E_A'$ of concentration $N_A'$. These two cases are analogous in that the peak spectral response is at the same wavelength value $\lambda$. The equilibrium background carrier concentration in the absence of any illumination for case 1 and case 2 are respectively:

$$n=\frac{N_D}{N_A}\beta N_C C^{-(E_C-E_A)/KT}$$

Eq. (1) Case 1 for $$N_A > N_D \text{ and } \frac{E_C-E_A}{KT} >> 1$$

$$n=\frac{N_D-N_A'}{N_A}\beta N_C C^{-(E_C E_D')/KT}$$

Eq. (2) Case 2 for $$N_D' > N_A' \text{ and } \frac{E_C-E_D'}{KT} >> 1$$

where

- $\beta$ — spin degeneracy of the either $E_A$ or $E_D'$
- $K$ — Boltzman constant
- $T$ — absolute temperature
- $N_C$ — effective density of states in the conduction band. From Eq. (1) it is seen that as $N_A$ becomes larger, $n$ becomes smaller, and for silicon it is possible for $N_D/N_A$ to be as small as 0.01. From Eq. (2) it is seen that in theory it is possible to reduce $n$ for the conventional photodetector by making $N_A'$ nearly equal to $N_D'$, but in practice it is very difficult to realize this condition because of non-uniformities in dopant concentrations. If $N_A'$ is greater than $N_D'$, type conversion will occur and the detector will no longer operate at the wavelength $\lambda$. Because of these practical considerations, $N_A'$ is generally equal to or less than $N_D$, giving $(N_D'-N_A')/N_A'$ values equal to or greater than 1. It is seen that in practice it is possible to make the equilibrium background carrier concentration smaller for the irradiated photodetector than for the conventional photodetector.

SUMMARY OF THE INVENTION

The invention includes the following steps: silicon material is cut into the desired shape; ohmic contacts are made on each end of the shaped semiconductor material by diffusing an $n^+$ or $p^+$ layer (heavily doped semiconductor layer) and then vapor depositing arsenic doped gold or aluminum onto these surfaces and alloying it at 650°C.; the gold contacts are also electrolessly nickel plated to make them more rugged; the contacted ends are masked and the detectors are etched in an $HNO_3$:HF solution to remove work damage introduced during sectioning and to remove impurities on the surface introduced during the contacting step; and the semiconductor material is irradiated with a 7 MeV electron collimated beam until the resistance of the detector at 77°K is greater than $10^6$ ohms.

DETAILED DESCRIPTION OF THE INVENTION

Turning now to the specific embodiment and process selected for illustration of the invention the first step in the process consists of cutting an n-type or a p-type silicon material into a desired shape. The silicon material is doped with impurities that give rise to shallow energy levels. The shape of the detector could be the shape of a parallelepipid, a disc or a cylinder. In the specific process chosen the shape is a parallelepipid 2mm × 2mm × 5mm which is designated by the numeral 11 in FIG. 1. Ohmic contacts 12 are formed on the two ends the detector by diffusing an $n^+$ or $p^+$ layer and then vapor depositing arsenic doped gold or aluminum onto these surfaces and alloying it at 650°C. The gold contacts 12 are also electrolessly nickel plated as designated by numeral 13 to make them more rugged. The contact ends of the detector are then masked and the detector is etched in an $HNO_3$:HF solution to remove work damage introduced during sectioning and to remove impurities on the surface introduced during the contacting process.

Figure 1:
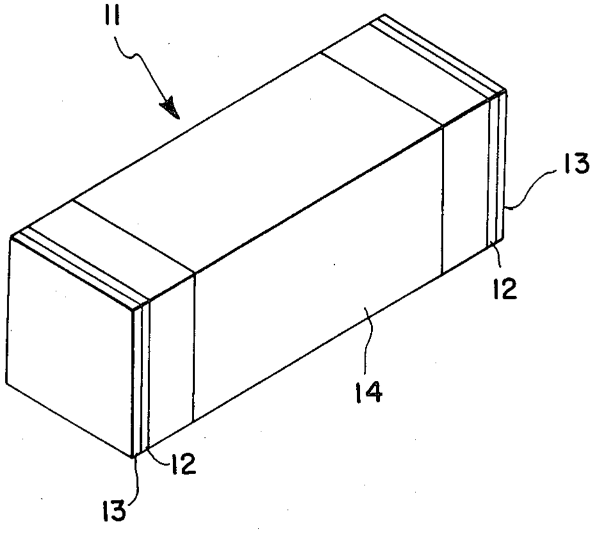
FIG. 1 is a schematic drawing of an IR photodetector made by the method of this invention.
Figure 2:
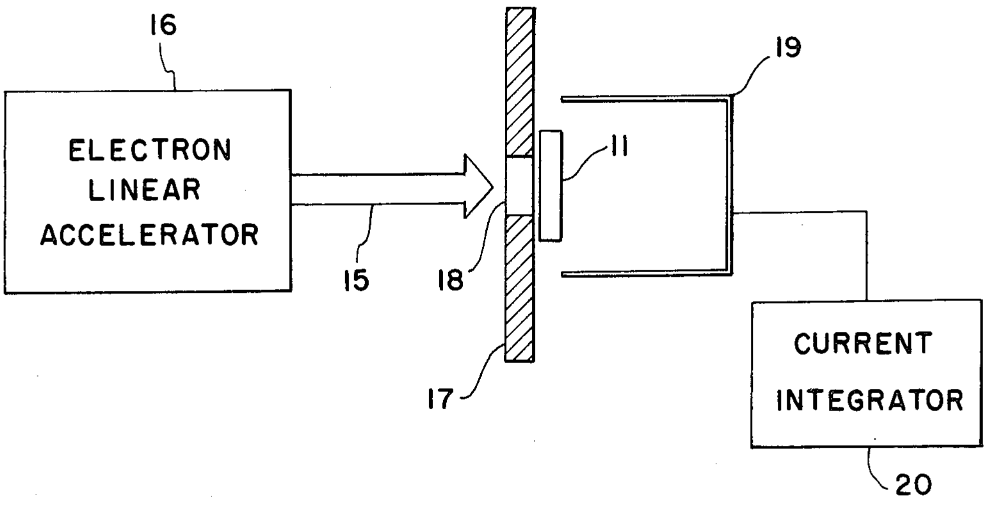
FIG. 2 is a schematic drawing of the apparatus used to perform the essential step in the method of this invention.

The detector 11 is irradiated with a 7 MeV electron beam 15 from an electron linear accelerator 16 (FIG. 2) until its resistance at 77°K. is greater than $10^6$ ohms. A 7 MeV electron beam uniformly introduces defect levels in the detector. Beam 15 is collimated by means of a shield 17 with an opening 18 so that a 3mm section in the middle of detector 11 is irradiated and not the contact regions. Since the mean range of the 7 MeV electron beam 15 is 16mm, some 8 times as great as the thickness of detector 11, a Faraday cup 19 with a current integrator 20 is used for monitoring the beam intensity. The beam intensity and fluence is varied between 1 and 10$\mu$ amps and $10^{16}$ and $10^{18}$ electrons per $cm^2$, respectively, depending on the initial resistivity and conduction type of the silicon. The irradiated section of the detector 11 in FIG. 1 is designated by the numeral 14.

Tests run on IR photodetectors made in accordance with the method of this invention indicate that irradiated silicon used as photodetectors exhibit a performance that is comparable to or greater than that of commercially available detectors in the 2-to-4 micron region.

Even though the process and detector described above uses silicon, it should be understood that any semiconductor material could be used without departing from the spirit or scope of this invention.

What is claimed as new and desired to be secured by Letters Patent of the United States is:

1. Method for making photodetectors with high quality performance in the infrared range comprising the steps of: cutting a piece of a semiconductor material to the desired shape of the photodetector; forming ohmic contacts on both ends of said piece; and irradiating the central portion of said piece with an electron beam to uniformly introduce defect levels in the semiconductor material.

2. Method according to claim 1 wherein said central portion of said piece is irradiated with a 7 MeV electron beam until its resistance at 77°K. is greater than $10^6$ ohms.

3. Method according to claim 2 wherein said semiconductor material is an impurity doped semiconductor material with shallow energy levels.

4. Method according to claim 1 wherein said forming step includes the steps of diffusing a heavily doped semiconductor and vapor depositing an arsenic doped metal onto both ends of said piece.

* * * * *